US005123626A

United States Patent [19]

Schlagmüller et al.

[11] Patent Number: 5,123,626

[45] Date of Patent: Jun. 23, 1992

[54] ELECTROMAGNETIC ON-OFF VALVE

[75] Inventors: Walter Schlagmüller, Schwieberdingen; Helmut Rembold, Stuttgart; Martin Müller, Asperg; Ehrtfried Bäumel, Schesslitz, all of Fed. Rep. of Germany

[73] Assignee: Robert Bosch GmbH, Stuttgart, Fed. Rep. of Germany

[21] Appl. No.: 663,925

[22] PCT Filed: Jul. 26, 1990

[86] PCT No.: PCT/DE90/00574

§ 371 Date: Mar. 25, 1991

§ 102(e) Date: Mar. 25, 1991

[87] PCT Pub. No.: WO91/03641

PCT Pub. Date: Mar. 21, 1991

[30] Foreign Application Priority Data

Mar. 30, 1989 [DE] Fed. Rep. of Germany ....... 3928613

[51] Int. Cl.[5] .............................................. F16K 31/06

[52] U.S. Cl. .......................... 251/129.02; 251/129.16; 251/129.17

[58] Field of Search ...................... 251/129.16, 129.02, 251/129.17, 129.19

[56] References Cited

U.S. PATENT DOCUMENTS 2,697,581 12/1954 Ray ................................ 251/129.16

4,957,275 9/1990 Homes ........................... 251/129.02

*Primary Examiner*—Arnold Rosenthal

*Attorney, Agent, or Firm*—Edwin E. Greigg; Ronald E. Greigg

[57] ABSTRACT

An electro-magnetic on-off valve for controlling the opening area of a fluid line, in particular for fuel injection pumps, having a valve element constructed on a valve needle, said valve element cooperating with a valve seat. The valve needle is connected to a magnetic armature of an electromagnet, the magnetic armature moving in a fluid for the purpose of achieving high switching speeds, and being sealed with respect to the liquid-conducting region of the valve. For any purpose of extensive damping of the rebound oscillations which occur when the valve closes and lead to the re-opening of the valve, the connection between the magnetic armature and valve needle is produced by a coupling and which is designed in such a way that after the rebound of the valve element against the valve seat occurring when the valve closes, the magnetic armature and the valve needle oscillate in phase opposition with respect to one another.

26 Claims, 2 Drawing Sheets

ELECTROMAGNETIC ON-OFF VALVE

PRIOR ART

The invention is based on an electromagnetic on-off valve for controlling the opening area of a fluid line, in particular for fuel injection pumps. Such on-off valves, known for example from DE 37 32 553 A1, in which it is not a liquid but rather air which flows around the magnetic armature, have a relatively high switching speed since the magnetic armature which is very large in area no longer moves in the fluid and is thus hydraulically damped.

However, in the quickly switching solenoid valves a problem arises of a rebounding of the valve element after the closing of the valve. If such a solenoid valve is used in fuel injection pumps, the re-opening of the valve element results, due to its rebounding, in inadmissibly large leakage quantities of the injected fuel quantity. The rebounding of the valve can be limited to a noncritical value by designing the valve seat geometry such that, as result of the constricted flow when the valve closes, a sufficiently large damping force arises within the cover. However, this requires a high degree of production accuracy with respect to sealing surface angle differential and roughness of the surfaces on the valve seat and valve member.

ADVANTAGES OF THE INVENTION

The electromagnetic on-off valve has in contrast to the above, an advantage that, as a result of the oscillating in phase opposition of the two masses of the valve needle and magnetic armature, the rebound amplitude occurring at the valve element is very small and declines rapidly. The leakage quantities still occurring when using the valve in fuel injection pumps are thus extremely small and lie without exception in the tolerance range. When an extension rod is used for the elastic coupling of the magnetic armature and valve needle, the correct setting of the elastic coupling occurs by setting the pre-tension of the extension rod.

Advantageous further developments and improvements of the on-off valve specified herein are possible by means of the measures disclosed.

According to a preferred embodiment of the invention, the extension rod extends inside the hollow-cylindrical valve needle, into whose end facing the magnetic armature a terminating piece with a T-shaped cross-section projects, which terminating piece bears the magnetic armature on its cross piece and is thus supported on the valve needle and bears a threaded bore in its centre part. The extension rod is screwed into the centre part of the terminating piece at one end and is supported with its other end on the valve needle. By rotating, the extension rod can be screwed more or less deeply into the threaded bore and its pre-tension can thus be altered in such a way that the correct oscillation of the two masses in phase opposition is achieved. For this purpose it is necessary to measure the timing of the stroke of the magnetic armature and valve needle, which is readily possible with suitable devices.

According to a further embodiment of the invention, the centre part of the terminating piece bears an external thread on which an adapter sheath is screwed. The adapter sheath, on the one hand, secures the membrane which seals the electromagnet off with respect to the liquid and, on the other hand, is supported on the end side of the valve needle. The latter has the advantage that, on the closing of the valve, a gap forms, as a result of constricted flow, between the end side of the valve needle and the end side of the adapter sheath resting against it, in which gap energy is additionally destroyed, as a result of which the rebounding of the valve element is additionally reduced.

DRAWING

The invention is explained in greater detail in the subsequent description with reference to an exemplary embodiment illustrated in the drawing, in which:

FIG. 1 shows a longitudinal section of an electromagnetic on-off valve for a fuel injection pump, FIGS. 2 and 3 show in each case a diagram of the timing of the stroke of the valve needle and magnetic armature when the elastic coupling between valve needle and magnetic armature is correctly adjusted (FIG. 2) and when it is incorrectly adjusted (FIG. 3).

DESCRIPTION OF THE EXEMPLARY EMBODIMENT

Figure 1:
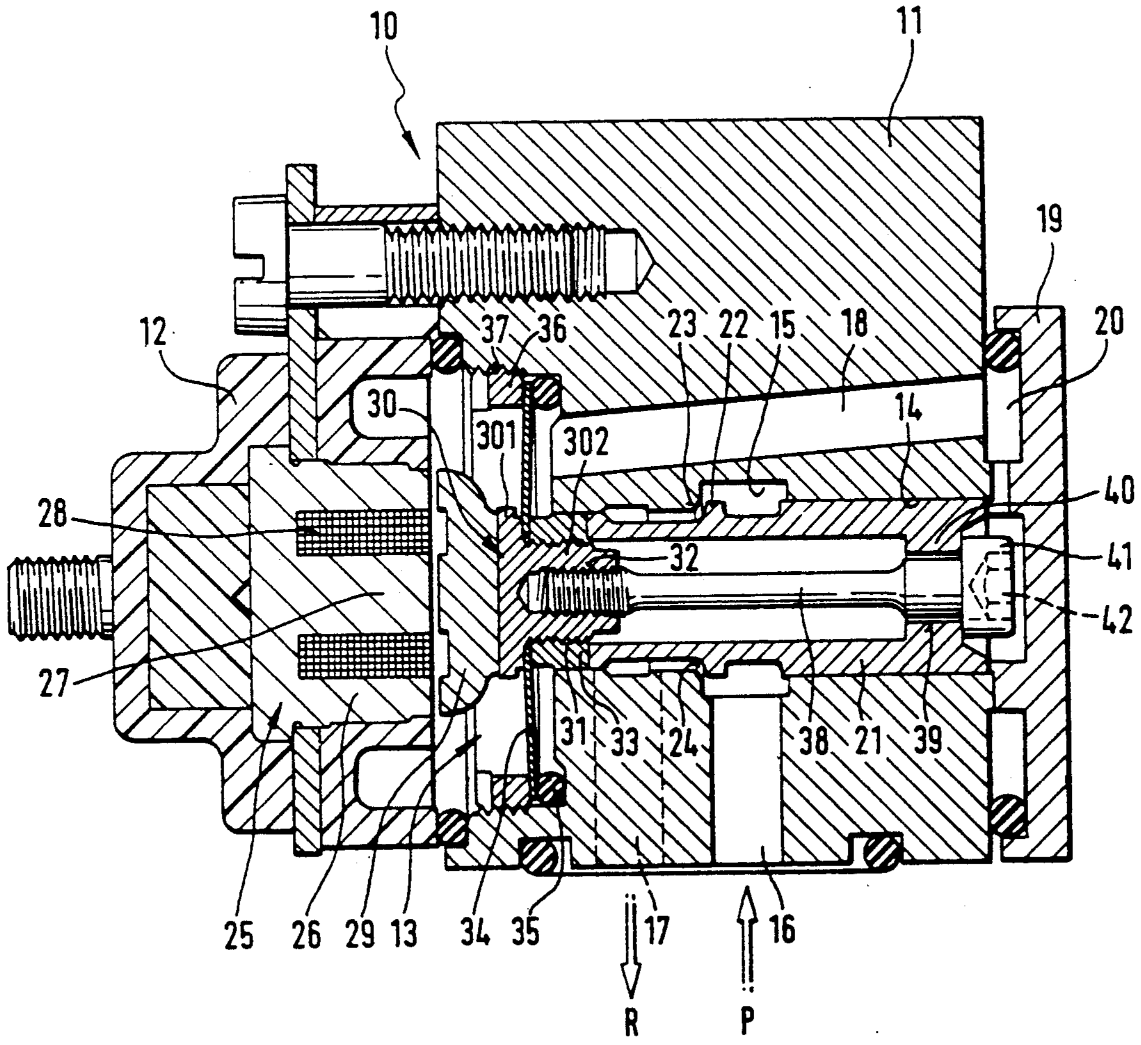

The electromagnetic on-off valve illustrated in longitudinal section in FIG. 1 has a two-part valve housing 10 comprising a metallic valve block 11, and a cap 12 made of plastic placed thereon. The cap 12 covers a recess 13 in the valve block 11, in which recess a through-bore 14 opens coaxially. Approximately in the centre lengthwise of the through-bore 14, an annular groove 15 is made in which an outwardly leading transverse bore opens, said transverse bore forming the fuel inlet 16 of the valve housing 10. A further transverse bore which also leads outwards and opens in the through-bore 14 at a distance from the said first transverse bore, forms the fuel outlet 17. In addition to the through-bore 14, an oblique bore 18 opens in the recess 13 and leads outwards on the same side of the valve block 11, on which side the through-bore 14 also ends. The through-bore 14 and oblique bore 18 are covered in a fluid-tight manner by a lid 19, in which there is an annular groove 20 which is connected to the through-bore 14 and the oblique bore 18 and to a fuel return line (not illustrated).

In order to control the connection between fuel inlet and fuel outlet 16, 17, a valve needle 21 is guided in an axially displaceable manner in the through-bore 14, said valve needle bearing in the region of the annular groove 15 a valve element 22 which cooperates with a valve seat 23. The valve seat 23 is constructed in a circular ring shape on the groove edge of the annular groove 15 facing the fuel outlet 17 and encloses a valve opening 24 between the fuel inlet 16 and the fuel outlet 17. The valve needle 21 is actuated by an electromagnet 25 which is accommodated, with liquid flowing around it, in the plastic cap 12. The electromagnet 25 of rotationally symmetrical construction has, in a known manner, a magnetic pot 26 of low-retentivity material with a coaxial pot core 27 which extends away from the pot floor, an excitation coil 28 which encloses the pot core 27 and a magnetic armature 29 lying opposite the magnetic pot 26 and pot core 27 with a working air gap spacing. On the side of the magnetic armature 29 facing away from the magnetic pot 25, a terminating piece 30 with a T-shaped cross-section is fastened by its cross piece 301. The terminating piece 30 bears an external thread 31 and a coaxial threaded bore 32 on its centre part 302. Screwed onto the external thread 31, there is a clamping sleeve 33 which clamps the inner edge of an annular membrane 34 on the cross piece 301 of the terminating piece 30. The outer edge of the membrane 34 is secured between an annular seal 35 resting against the base of the recess 13 and the end side of a screw ring 36 which is screwed into an internal thread 37 in the recess 13. The membrane 34 consisting of metal is pre-tensioned against the magnetic force of the electromagnet 25. Thus, it fulfils two functions, namely, on the one hand, the sealing of the electromagnet 25 with respect to the liquid-conducting region in the valve block 11 and, on the other hand, the restoring of the magnetic armature 29 when the electromagnet 25 is not excited.

The one end of an extension rod 38 is screwed into the threaded bore 32 of the terminating piece 30, said extension rod drawing through the valve needle 21 coaxially and, with its other end, passing through a bore 39 in the valve needle 21. At the end, the cross web 40 supports a head 41 of extension rod 38 which is supported on the outside of the cross web 40. The head 41 is provided with a socket for socket head cap tools 42 for the insertion of a rotational tool. The head 41 is covered by the cover 19 so that the socket for socket head cap tools 42 is not exposed until the cover 19 is taken off for the insertion of the rotational tool. When the extension rod 38 has been mounted, the terminating piece 30 projects with its centre part 302 into the valve needle 21, the clamping sleeve 33 pressing against the annular end side of the valve needle 21. The extension rod 38 forms an elastic coupling between the valve needle 21 and the magnetic armature 29 of the electromagnet 25 which is set as a result of corresponding pre-tensioning of the extension rod 38 in such a way that after the rebound of the valve element 22 against the valve seat 23 occurring when the valve closes, the magnetic armature 29 and the valve needle 21 oscillate in phase opposition with respect to one another. The pre-tensioning of the extension rod 38 can be set by screwing the thread end of the extension rod 38 into the threaded bore 32 in the terminating piece 30 more or less deeply.

Figure 2:
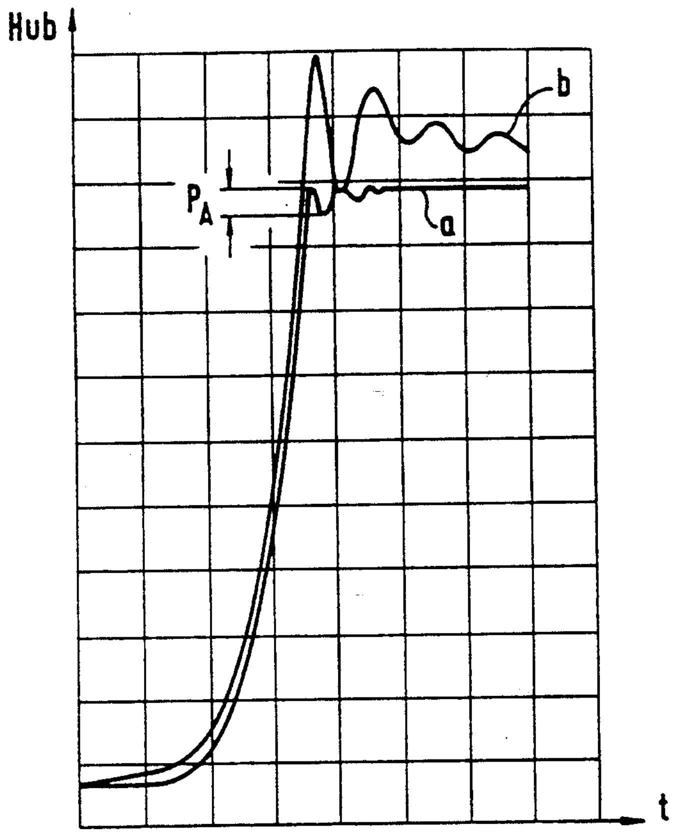
Figure 3:
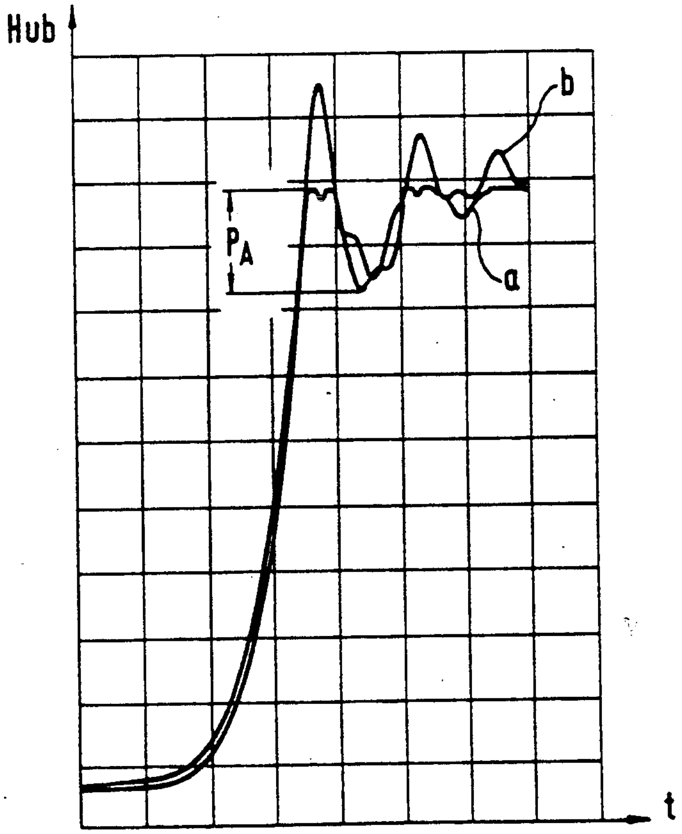

Each of FIGS. 2 and 3 show a diagram of the timing of the stroke of the valve needle 21 (curve a) and magnetic armature 29 (curve b) when the electromagnet 25 is excited. FIG. 2 shows the correct setting of the pre-tensioning of the extension rod 38. The valve needle 21 and the magnetic armature 29 oscillate in phase opposition, the rebound amplitude $P_A$ is very small. In contrast, in the diagram in FIG. 3 the valve needle 21 and magnetic armature 29 oscillate in phase. The rebound amplitude $P_A$ is a multiple of the rebound amplitude in FIG. 2. Here, an adjustment of the pre-tensioning of the extension rod 38 must be made using a rotational tool which is inserted into the socket for socket head cap tools 42 of the head 41 after removing the cover 19.

It would be obvious to one skilled in the art that the valve closes as the valve needle and armature is moved toward the coil 28 and will be open when the armature and valve needle are moved away from the coil.

We claim:

1. An electromagnetic on-off valve for controlling the opening area of a fluid line, in particular for fuel injection pumps, having a valve housing having a fluid inlet and fluid outlet to be connected into the fluid line, a valve opening which is arranged between the fluid inlet and fluid outlet and surrounded by a valve seat, a valve member which cooperates with the valve seat in order to close and release the valve opening, an electromagnet håving a magnetic core, an excitation coil and a magnetic armature, said electromagnet being arranged in a housing chamber, the magnetic armature of said electromagnet being connected to the valve member a restoring spring that counteracts the magnetic force, for restoring the valve member when the magnetic excitation ceases, the connection between the magnetic armature (29) and valve member (21) is produced by means of an extension screw bolt guided through a longitudinal hole of the valve member and biasing the valve member to said magnetic armature from which the valve member is detachable by said magnetic force against the biasing force of the screw bolt when the valve member abuts on its valve seat.

2. A valve according to claim 1, in which a terminating piece (30) with a T-shaped cross-section projects into the end of the valve needle (21) facing the magnetic armature (29), said terminating piece supporting the magnetic armature (29) on a cross piece (301) and having a threaded bore (32) in a centre part (302), and the extension screw bolt (38) which is supported on the valve member (21) is screwed at its end side into the threaded bore (32).

3. A valve according to claim 2, in which the extension screw bolt (38) rests with a head (41) at its end side against a cross web (40) in the valve member (21).

4. A valve according to claim 1 in which the valve member (21) is guided in an axially displaceable manner in a bore (14), containing the valve opening (24) as an annular groove (15), in the valve housing (11), and sealing of the housing chamber (12), which receives the electromagnet (25), with respect to the bore is carried out by means of an annular membrane (34), said membrane being clamped in a fluid-tight manner on the valve member (21) by an inner edge and in the valve housing (11) by an outer edge.

5. A valve according to claim 2, in which said centre part (302) of the T-shaped terminating piece (30) bears an external thread (31), on which a clamping sleeve (33) is screwed, and clamping of the membrane (34) on the valve member (21) is carried out between an end side of the clamping sleeve (33) and the cross piece (301) of the terminating piece (30) which projects radially over the clamping sleeve (33).

6. A valve according to claim 4, in which a fuel return bore (8) opens on a side of the membrane (34) facing away from the housing chamber (12) for the electromagnet (25).

7. A valve according to claim 4 in which the membrane (34) is pre-tensioned against the magnetic force of the electromagnet (25) and forms a restoring spring for the valve member (21).

8. A valve according to claim 2 in which the valve member (21) is guided in an axially displaceable manner in a bore (14), containing the valve opening (24) as an annular groove (15), in the valve housing (11), and sealing of the housing chamber (12), which receives the electromagnet (25), with respect to the bore is carried out by means of an annular membrane (34), said annular membrane being clamped in a fluid-tight manner on the valve member (21) by an inner edge and in the valve housing (11) by an outer edge.

9. A valve according to claim 3 in which the valve member (21) is guided in an axially displaceable manner in a bore (14), containing the valve opening (24) as an annular groove (15), in the valve housing (11), and sealing of the housing chamber (12), which receives the electromagnet (25), with respect to the bore is carried out by means of an annular membrane (34), said annular membrane being clamped in a fluid-tight manner on the valve member (21) by an inner edge and in the valve housing (11) by an outer edge.

10. A valve according to claim 4, in which a centre part (302) of a T-shaped terminating piece (30) bears an external thread (31), on which a clamping sleeve (33) is screwed, and clamping of the membrane (34) on the valve member (21) is carried out between an end side of the clamping sleeve (33) and a cross piece (301) of the terminating piece (30) which projects radially over the clamping sleeve (33).

11. A valve according to claim 8, in which a centre part (302) of a T-shaped terminating piece (30) bears an external thread (31), on which a clamping sleeve (33) is screwed, and clamping of the membrane (34) on the valve member (21) is carried out between an end side of the clamping sleeve (33) and a cross piece (301) of the terminating piece (30) which projects radially over the clamping sleeve (33).

12. A valve according to claim 9, in which a centre part (302) of a T-shaped terminating piece (30) bears an external thread (31), on which a clamping sleeve (33) is screwed, and clamping of the membrane (34) on the valve member (21) is carried out between an end side of the clamping sleeve (33) and a cross piece (301) of the terminating piece (30) which projects radially over the clamping sleeve (33).

13. A valve according to claim 5, in which a fuel return bore (8) opens on a side of the membrane (34) facing away from the housing chamber (12) for the electromagnet (25).

14. A valve according to claim 10, in which a fuel return bore (8) opens on a side of the membrane (34) facing away from the housing chamber (12) for the electromagnet (25).

15. A valve according to claim 5, in which a fuel return bore (8) opens on a side of the membrane (34) facing away from the housing chamber (12) for the electromagnet (25).

16. A valve according to claim 6, in which a fuel return bore (8) opens on a side of the membrane (34) facing away from the housing chamber (12) for the electromagnet (25).

17. A valve according to claim 11, in which a fuel return bore (8) opens on a side of the membrane (34) facing away from the housing chamber (12) for the electromagnet (25).

18. A valve according to claim 12, in which a fuel return bore (8) opens on a side of the membrane (34) facing away from the housing chamber (12) for the electromagnet (25).

19. A valve according to claim 6, in which the membrane (34) is pre-tensioned against the magnetic force of the electromagnet (25) and forms a restoring spring for the valve needle (21).

20. A valve according to claim 13, in which the membrane (34) is pre-tensioned against the magnetic force of the electromagnet (25) and forms a restoring spring for the valve needle (21).

21. A valve according to claim 14, in which the membrane (34) is pre-tensioned against the magnetic force of the electromagnet (25) and forms a restoring spring for the valve needle (21).

22. A valve according to claim 15, in which the membrane (34) is pre-tensioned against the magnetic force of the electromagnet (25) and forms a restoring spring for the valve needle (21).

23. A valve according to claim 16, in which the membrane (34) is pre-tensioned against the magnetic force of the electromagnet (25) and forms a restoring spring for the valve needle (21).

24. A valve according to claim 17, in which the membrane (34) is pre-tensioned against the magnetic force of the electromagnet (25) and forms a restoring spring for the valve needle (21).

25. A valve according to claim 18, in which the membrane (34) is pre-tensioned against the magnetic force of the electromagnet (25) and forms a restoring spring for the valve needle (21).

26. A valve according to claim 1 in which said fluid that flows around said electromagnet is air and said coupling is made of an elastic material.

* * * * *